Patented Dec. 14, 1943

2,336,472

UNITED STATES PATENT OFFICE 2,336,472

TREATMENT OF TALL OIL AND PRODUCTS OBTAINED THEREFROM

Russell G. Dressler, Nutley, N. J., and Robert E. Vivian, Los Angeles, Calif.

No Drawing. Application October 30, 1939, Serial No. 302,056

12 Claims. (Cl. 260—97.5)

This invention pertains to the pre-treatment of tall oil whereby hydrogenation and like treatment thereof is facilitated, and to new and useful products obtained thereby. The hydrogenation may be accomplished as set out in our co-pending application, Serial No. 291,398, filed August 22, 1939.

Crude tall oil is a by- or waste-product of the sulfate or soda processes of the pulp and paper industry. In general, the term is associated with the sulfate process.

Tall oil is a complex material, the chemical composition of which is little known. It contains unsaturated fatty acids in simple or polymerized form, liquid and solid resin acids virtually unknown as to structure, and unsaponifiable matter containing sterols. Any attempted quantitative analysis of the three mentioned principal constituent bodies of tall oil results only in an arbitrary classification. It has been shown that tall oil is a material which is specific in its character and chemical properties, and not to be duplicated by a simple blending of ingredients.

Samples of tall oil vary considerably in composition, with respect to content of resin acids, fatty acids, and unsaponifiable matters. Typical specimens of tall oil as produced in the United States show that crude tall oil may contain from 30 to 65 percent of resin acids, 40 to 60 percent of fatty acids, and up to 10 percent of unsaponifiable matters; while refined and bleached (or distilled) tall oil may contain, for example, from 35 to 40 percent of resin acids, 50 to 60 percent of fatty acids, and up to 10 percent of unsaponifiable matter. The present procedure has been found advantageous in effecting hydrogenation of such materials in the crude, semi-refined and refined states. By way of specific example, the materials employed during the work involving the experimental examples set out below had the following characteristics: crude tall oil—33.6 percent resin acids, 56 percent fatty acids, 8.3 percent unsaponifiable matter, iodine number 166 (modified Wijs), thiocyanogen number 74.4, acid number 154, melting point 20 degrees C., sulphur content .08 percent; while the refined and bleached (distilled) tall oil comprised 38.5 percent resin acids, 51 percent fatty acids, 4.6 percent unsaponifiable matter, iodine number 161, thiocyanogen number 64, acid number 164, melting point 19 degrees C., sulphur content .06 percent.

Crude tall oil has found little application in industry due to its black or dark brown color, liquidity, and stickiness, and due to its non-uniformity of chemical composition. The odor is that of pine oil products, along with a distinct smell of mercaptans, and hence is offensive and renders the product unsuitable for general commercial purposes. This material normally appears on the market in a semi-solid state, as a viscous liquid containing varying amounts of suspended solid ingredients, which makes it difficult to handle commercially. The product known to commerce as "distilled tall oil," although it may have been improved somewhat as to color, being orange to brown, still has the disadvantages of being of pine or aromatic odor (with a definite indication of mercaptans), sticky, and non-uniform in physical and chemical composition.

The tall oils are very difficult to hydrogenate; and success is not achieved by applying methods commonly used in hydrogenating vegetable oils or fatty acids. A procedure of attempted hydrogenation of resin acids, for example, can lead not only to the addition of hydrogen at the double (unsaturated) bands, but also to rearrangement and displacements of original hydrogen under the conditions of treatment, as well as to actual dehydrogenation and establishment of further double bonds. As set out in our co-pending application, attempts to hydrogenate these tall oils by ordinary means, such as used for hydrogenating cottonseed oil, for example, fail due to the difficulty of hydrogenation because of the nature of the material, and because of the presence of sulfur-bearing and other accumulated or natural catalytic poisons. It has been found that the crude tall oil is more difficult to hydrogenate than the distilled tall oil, although analyses have shown that their total sulfur contents are practically the same. It would naturally be assumed by persons skilled in the art of hydrogenation that the resistance exhibited by tall oils with respect to hydrogenation is mainly or entirely due to the presence of sulfur-containing substances, for the reason that it is generally agreed that sulfur and its combinations constitute violent poisons to hydrogenation catalysts of nickel and like types. In analysis and studies of the effects of the sulfur content of various types of tall oil, it has been found that substances other than sulfur-containing matters also act as poisons during hydrogenation by means of catalysts.

We have found it necessary to provide conditions so that the reaction are of hydrogenation is far higher than with cottonseed oil. Further, while crude cottonseed oil and the like contain catalyst poisons, it is feasible to eliminate such poisons by a simple refining treatment with caustic soda solution, but in the case of tall oil, this soda-refining treatment cannot be successfully applied on either the crude or the distilled tall oil because of the chemical composition of the material.

Even excessive amounts of catalyst, at low pressures or with the use of methods employed in hydrogenating cottonseed oil, do not give success. The required long period of contact (100 hours for example) between the catalyst and the tall oil lead to discoloration and degeneration of the products, and the product has a greenish color, owing to the presence of nickel compounds produced from the catalyst, as well as discoloration from the decomposition and degeneration of tall oil substances, indicating a lessened efficiency of the operation. The materials cannot be commercially employed where a quality material is required, such as in the manufacture of a high grade soap, due to the presence of green nickel soaps and the decomposition products of the tall oil.

It has been found that the resistance of tall oils to hydrogenation may be reduced by pre-treatment by means of natural or activated adsorbent clays and earths or like adsorbent matters such as carbons, or by means of spent or un-spent hydrogenation catalysts including those which are capable of effecting disproportionation through dehydrogenation and/or hydrogenation of the original rosin acid molecule, either directly or while the tall oil is dissolved or extended in a suitable solvent in which the adsorbent is suspended.

Experience has shown that dark-colored tall-oils are not significantly bleached by bleaching clays, activated carbons, or simple adsorbents when the treatment is carried out according to the prevailing methods of bleaching purposes for vegetable fats and oils. However, the action of such substances in provoking a removal or immunization of catalytic poisons from tall oils is highly advantageous as a preliminary to hydrogenation thereof.

The following examples indicate typical treatments according to this invention.

*Example I*

200 grams of a typical crude tall oil were mixed with 20 grams of an active bleaching clay such as is used for vegetable oils. This mixture was heated to and maintained at 120 to 130 degrees C., and agitated by rocking for a period of fifteen minutes, while a nonoxidizing atmosphere (hydrogen) was maintained in contact therewith. The tall oil was filtered free from the clay and the material adsorbed therein, and was found to be substantially unchanged in color. This pre-treated and filtered tall oil was hydrogenated three times at 200 pounds hydrogen pressure and at 180 degrees C. for time intervals of ½ hour each, each time employing ½ percent of fresh nickel catalyst, filtering off the spent catalyst before adding the fresh portion. The hydrogenated tall oil was a solid of light color and had a melting point of 35 degrees C., with thiocyanogen number 55, as compared with the viscous liquid nature of the original crude tall oil at 20 degrees C.

*Example II*

In another run, 200 grams of crude tall oil were mixed with 15 grams of bleaching clay of different origin, as prepared by a different company and by another process than the clay used in Example I. This mixture was agitated at 120 degrees C. in a hydrogen atmosphere for fifteen minutes, and filtered at the end of that time. The pre-treated and filtered tall oil was hydrogenated four times at 200 pounds hydrogen pressure for time intervals of ½ hour each, using ½ percent of nickel catalyst each time, filtering off the spent catalyst before adding the fresh portion. It yielded a satisfactory hydrogenated tall oil having a melting point of 48 degrees C., iodine number 87 (modified Wijs), and thiocyanogen number 40. The product was of a yellow color as contrasted with the black from crude tall oil; and was substantially free of mercaptan or pine odors.

*Example III*

200 grams of crude tall oil were dissolved in 1000 grams of cleaner's naphtha and the solution heated to 110 degrees C. While maintaining the temperature at 110 degrees C., 40 grams of bleaching earth were added and the mixture agitated for five minutes. At the end of this time, the liquid phase was filtered from the solids, and the solvent removed by steam-distillation. A minor bleaching of the tall oil was observed. The pre-treated and filtered tall oil constituting the residue from steam-distillation, was subjected to hydrogenation for three times at 200 pounds per square inch of hydrogen pressure, for ½ hour each, at 180 degrees C., using ½ percent of nickel each time as a catalyst, and filtering off spent catalyst before adding the fresh catalyst. The product was a hydrogenated tall oil of light color and having a melting point of 41 degrees C., and thiocyanogen number 50.

*Example IV*

A 15 percent solution of the crude tall oil by weight in cleaner's naphtha was treated with a bleaching clay. The amount of clay was 1 gram to each 3 grams of crude tall oil. Treatment was for five minutes at 105–110 degrees C. in an atmosphere of hydrogen. The treated solution was filtered and then the solvent steam-distilled. The pre-treated tall oil was of yellow color and had been de-poisoned. 100 grams of this pre-treated tall oil were hydrogenated for one hour at 180 degrees C. and 1400 pounds hydrogen pressure using 0.5 percent of nickel (on diatomaceous earth) as catalyst which gave a hydrogenated product of light yellow color and melting point 29 degrees C.

Other examples of pre-treatment are set out in our co-pending application, Serial No. 291,398, filed August 22, 1939.

*Example V*

200 grams of the same crude tall oil as in Example III were dissolved in 1000 grams of cleaner's naphtha, heated to 110 degrees C. and held at this temperature for five minutes. The liquid phase was then filtered, and subjected to steam distillation to remove the solvent. The product was then hydrogenated as in Example III. The resulting material had a melting point of 29 degrees C. This pre-treatment led to a type of purification, but did not lead to the high melting point of the treatment according to Example III, thus indicating the advantage of the pre-treatment with clay or like adsorbent.

Further, it has been found that the catalyst itself may be employed as a pre-treating agent. When a large quantity, such as 10 or 20 percent of the nickel or like catalyst is agitated with the crude tall oil, at a temperature of 100 to 130 degrees C., a similar purification is effected, although no substantial hydrogenation is accomplished even though hydrogen atmosphere is employed to prevent deterioration of the tall oil. Upon separating the spent nickel material, fresh nickel is introduced in minor percentage, as set out above, and hydrogenation can then be regularly effected with the production of a material of increased melting point.

It is not necessary, however, to employ fresh catalyst for such purposes, as it has been found that the spent catalyst from a hydrogenation treatment is still capable of effecting a pre-treatment to increase the rate of hydrogenation after such pre-treatment.

Further, mixtures of the various adsorbent matters and catalysts have been found to be effective for the pre-treatment.

According to the present process of converting tall oils by hydrogenation, commercially valuable, new and useful products have been obtained which upon tests, both physically and chemically, have been found to exhibit desirable qualities. The hydrogenated products are of much lighter and improved color, of increased stability, practically odorless, free from stickiness, physically homogeneous, and exceedingly more uniform in composition. In particular, it has been found that even a slight actual hydrogenation is advantageous, as the product is less subject to oxidation; this result being due to the elimination of high unsaturates from the composition, as indicated by the changes in stability and odor.

Differing conditions of times, temperatures, and pressures permit controlling the hydrogenation process as to degree of saturation desired. Conditions favorable to a higher degree of saturation during the hydrogenation operation comprise a longer time of hydrogenation, a larger proportion of catalyst, and higher hydrogen pressures. Both the physical and chemical properties of hydrogenated tall oil products depend on the degree of saturation, and tall oil products of different degrees of saturation may be used for different commercial purposes. For example, in manufacturing liquid soaps, a product of low hydrogenation with a melting point of about 25 degrees C. is preferable; while for manufacture of a high-titre laundry soap, a hydrogenated tall oil product of melting point 50 degrees C. is preferable.

For best results in hydrogenating tall oils, an intimate and quick mixing of catalyst, tall oil and hydrogen is necessary to prevent deterioration of the catalyst with time of contact. When tall oil or hydrogenated tall oil products are in a hot melted state, they are best kept in an inert atmosphere, to prevent gradual darkening of color. Any suitable non-oxidizing and non-halogenating atmosphere may be used for this purpose, such as hydrogen, carbon dioxide, nitrogen, or the rare gaseous elements. Similarly, such atmospheres are preferably employed during the pre-treatment.

Studies of the mechanism and course of the reaction, and analysis of the original tall oils and of the hydrogenated products, indicate that both the resin acids and the fatty acids undergo change due to a full or partial saturation of the unsaturated bonds.

These new hydrogenated products are capable of extensive use in industries requiring material of this nature, such as those engaged in the manufacture of soaps, rubber, greases and lubricants, etc. The product has valuable physical and chemical properties, as compared with the initial materials, in addition to its relative cheapness. It can, of course, be used advantageously to replace ordinary tall oil in its crude or unrefined condition, with the advantages of the higher melting point and lower unsaturation of the hydrogenated material. The hydrogenated products are characterized by their fatty nature which allows them to be used in processing industries where fatty materials are now used. Thus, they may be used to replace commercial oleic and stearic acids and other vegetable and animal oils and fats in soaps, textile dressings, etc.

It has been found that poisoning of the catalyst occurs rapidly, and is usually complete within an hour in laboratory practice: in commercial practice, a somewhat longer time is sometimes endured by the catalyst, corresponding to the usual rate of hydrogenation itself, but poisoning occurs and the several reactions show typical graphs which are similar in laboratory and commercial practice. Hence, it is desirable to subject the material to temperature and pressure immediately upon mixing with the catalyst; and to carry on the reaction rapidly, which is possible when high pressures are used. The reaction rate is of great importance, and the actual time of contact with the gas is a lesser consideration, because after the catalyst is poisoned, no appreciable reaction occurs regardless of the time of running; and the reaction can be stimulated only by the use of fresh catalyst. This reaction involves the tall oil, the catalyst, and hydrogen; and a greater quantity of hydrogen present produces a greater effective concentration of the hydrogen at the catalytic surfaces and increases the reaction rate. On the other hand, poisoning of the catalyst occurs principally between the tall oil (including its impurities) and the catalyst, that is, between a liquid and a solid, and there is no gaseous phase involved and therefore high pressures do not appreciably increase the rate of poisoning reactions; nor does the hydrogen itself appear to play any substantial part in the rate of such poisoning.

Thus, it is presently preferred to employ pressures of the order of 200 to 600 pounds, during the hydrogenation; although commercially economical results have been obtained by the use of pressures from 50 to 2500 pounds, and even lower pressures are feasible if due precautions are taken against side reactions arising from the usually longer times for hydrogenation at the lower pressures. For economy in equipment costs, 2500 pounds pressure presently appear as an upper limit of operating pressures.

It has been particularly noted that the presence of poisoned catalyst appears quickly to inactivate fresh catalyst, and hence spent catalyst should be separated before fresh is added. However, even this spent catalyst has been found valuable for pre-treatment to effect the presence of poisons in the initial matter.

The various hydrogenating catalysts can be employed. Among the catalysts which have been found effective are finely divided nickel, nickel deposited on diatomaceous earth, and nickel with copper as a co-catalyst, together with platinum, palladium, and nickel with other metals as co-catalysts or accelerators or promoters.

It is obvious that the invention is not limited to the specific examples shown, but that the process may be practiced and products obtained under other conditions within the scope of the appended claims.

We claim:

1. The process of hydrogenating a tall oil which contains substances effective to poison hydrogenation catalysts, which comprises agitating the tall oil at a temperature between 100 and 200 degrees C. and in contact with an inert gas and in the presence of substantially 7½ to 33⅓ percent by weight of the tall oil of a finely-divided adsorbent substance selected from the group consisting of spent and unspent hydrogenation catalysts, adsorbent carbon, and bleaching clays and earths and thereby effecting an elimination of catalyst poison without substantial change in the unsaturation of fatty and resin acids of the tall oil, separating the adsorbent, and thereafter treating with hydrogen under a super-atmospheric pressure exceeding 50 pounds per square inch and at a temperature between substantially 150 and 200 degrees C. and in the presence of a hydrogenation catalyst.

2. The process of hydrogenating crude tall oil, which comprises agitating the crude tall oil in contact with an inert gas and in the presence of substantially 7½ to 33⅓ percent by weight of the tall oil of a finely-divided adsorbent substance selected from the group consisting of spent and unspent hydrogenation catalysts, adsorbent carbon, and bleaching clays and earths and thereby effecting an elimination of catalyst poison without substantial change in the unsaturation of fatty and resin acids of the tall oil, removing the adsorbent, and thereafter treating with hydrogen under a super-atmospheric pressure exceeding 50 pounds per square inch and at a temperature between substantially 150 and 200 degrees C. and in the presence of a hydrogenation catalyst.

3. The process of hydrogenating a tall oil which contains substances effective to poison hydrogenation catalysts, which comprises dissolving the tall oil in a volatile solvent, suspending therein substantially 7½ to 33⅓ percent by weight of the tall oil of a finely-divided adsorbent selected from the group consisting of spent and unspent hydrogenation catalysts, adsorbent carbon, and bleaching clays and earths in the solution and thereby effecting an elimination of catalyst poison without substantial change in the unsaturation of fatty and resin acids of the tall oil, removing the adsorbent and solvent, and treating with hydrogen under a super-atmospheric pressure exceeding 50 pounds per square inch and at a temperature between substantially 150 and 200 degrees C. and in the presence of a hydrogenation catalyst.

4. The process of hydrogenating a tall oil which contains substances effective to poison hydrogenation catalysts, which comprises contacting the crude tall oil with substantially 10 to 20 percent by weight of the tall oil of spent hydrogenation catalyst at a temperature of substantially 100 to 130 degrees C. and in contact with an inert gas and thereby effecting an elimination of catalyst poison without substantial change in the unsaturation of fatty and resin acids of the tall oil, separating the spent catalyst, and thereafter treating with hydrogen under a super-atmospheric pressure exceeding 50 pounds per square inch and at a temperature between substantially 150 and 200 degrees C. and in the presence of a hydrogenation catalyst.

5. The process of hydrogenating a tall oil which contains substances effective to poison hydrogenation catalysts, which comprises agitating the tall oil at a temperature between 100 and 200 degrees C. in contact with an inert gas and with substantially 7½ to 33⅓ percent by weight of the tall oil of a finely-divided adsorbent substance selected from the group consisting of spent and unspent hydrogenation catalysts, adsorbent carbon, and bleaching clays and earths, and thereby effecting an elimination of catalyst poison without substantial change in the unsaturation of fatty and resin acids of the tall oil, and thereafter treating with hydrogen under a pressure in excess of 50 pounds per square inch and at a temperature between substantially 150 and 200 degrees C. and in the presence of a hydrogenation catalyst.

6. The process of hydrogenating a tall oil which contains substances effective to poison hydrogenation catalysts, which comprises agitating the tall oil at a temperature between 100 and 130 degrees C. in contact with an inert gas and with substantially 7½ to 33⅓ percent by weight of the tall oil of a finely-divided adsorbent substance selected from the group consisting of spent and unspent hydrogenation catalysts, adsorbent carbon, and bleaching clays and earths and thereby effecting an elimination of catalyst poison without substantial change in the unsaturation of fatty and resin acids of the tall oil, and thereafter treating with hydrogen under a pressure in excess of 50 pounds per square inch and at a temperature between substantially 150 and 200 degrees C. and in the presence of a hydrogenation catalyst.

7. The process of hydrogenating a tall oil which contains substances effective to poison hydrogenation catalysts, which comprises agitating the tall oil at a temperature between 100 and 130 degrees C. in contact with an inert gas and with substantially 7½ to 33⅓ percent by weight of the tall oil of a finely-divided adsorbent substance selected from the group consisting of spent and unspent hydrogenation catalysts, adsorbent carbon, and bleaching clays and earths, and thereby effecting an elimination of catalyst poison without substantial change in the unsaturation of fatty and resin acids of the tall oil, and thereafter treating with hydrogen under a pressure of substantially 200 to 600 pounds per square inch at a temperature between substantially 150 and 200 degrees C. and in the presence of a hydrogenation catalyst.

8. The process of hydrogenating a tall oil which contains substances effective to poison hydrogenation catalysts, which comprises agitating the tall oil at a temperature between 100 and 200 degrees C. and in the presence of an inert gas with substantially 7½ to 33⅓ percent by weight of the tall oil of finely-divided adsorbent carbon and thereby effecting an elimination of catalyst poison without substantial change in the unsaturation of fatty and resin acids of the tall oil, and thereafter treating with hydrogen under a super-atmospheric pressure exceeding 50 pounds per square inch and at a temperature between substantially 150 and 200 degrees C. and in the presence of a hydrogenation catalyst.

9. The process of hydrogenating a tall oil which contains substances effective to poison hydrogenation catalysts, which comprises agitating the tall oil at a temperature between 100 and 200 degrees C. and in the presence of an inert gas with substantially 7½ to 33⅓ percent by weight of the tall oil of finely-divided adsorbent bleaching clay and thereby effecting an elimination of catalyst poison without substantial change in the unsaturation of fatty and resin acids of the tall oil, and thereafter treating with hydrogen under a super-atmospheric pressure exceeding 50 pounds per square inch and at a temperature between substantially 150 and 200 degrees C. and in the presence of a hydrogenation catalyst.

10. The process of hydrogenating crude tall oil, which comprises agitating the crude tall oil at a temperature between 100 and 130 degrees C. and in the presence of an inert gas with 10 to 20 percent by weight of the tall oil of a finely-divided spent hydrogenation catalyst and thereby effecting an elimination of catalyst poison without substantial change in the unsaturation of fatty and resin acids of the tall oil, and thereafter treating with hydrogen under a super-atmospheric pressure exceeding 50 pounds per square inch and at a temperature between substantially 150 and 200 degrees C. and in the presence of a hydrogenation catalyst.

11. The process of hydrogenating crude tall oil, which comprises dissolving the crude tall oil in a volatile solvent, agitating the solution with 10 to 20 percent by weight of the tall oil of a finely-divided spent hydrogenation catalyst at a temperature between substantially 100 and 130 degrees C., and in the presence of an inert gas and thereby effecting an elimination of catalyst poison without substantial change in the unsaturation of fatty and resin acids of the tall oil, and thereafter treating with hydrogen under a super-atmospheric pressure exceeding 50 pounds per square inch and at a temperature between substantially 150 and 200 degrees C. and in the presence of a hydrogenation catalyst.

12. The process of hydrogenating crude tall oil, which comprises dissolving the crude tall oil in a volatile solvent, agitating the solution with 10 to 20 percent by weight of the tall oil of a finely-divided spent hydrogenation catalyst at a temperature between substantially 100 and 200 degrees C. and in the presence of an inert gas and thereby effecting an elimination of catalyst poison without substantial change in the unsaturation of fatty and resin acids of the tall oil, removing the catalyst and solvent, thereafter treating with hydrogen under a super-atmospheric pressure exceeding 50 pounds per square inch and at a temperature between substantially 150 and 200 degrees C. and in the presence of an active hydrogenation catalyst for a time of substantially one-half hour, removing the catalyst, and again hydrogenating under super-atmospheric pressure and at a temperature between substantially 150 and 200 degrees C. in the presence of a further portion of active hydrogenation catalyst.

RUSSELL G. DRESSLER.
ROBERT E. VIVIAN.